(12) United States Patent
Inoue (10) Patent No.: US 10,194,520 B2
(45) Date of Patent: Jan. 29, 2019

(54) INFORMATION PROCESSING APPARATUS (71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventor: Masayuki Inoue, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 15/535,089

(22) PCT Filed: Dec. 9, 2015

(86) PCT No.: PCT/JP2015/084468
§ 371 (c)(1),
(2) Date: Jun. 12, 2017

(87) PCT Pub. No.: WO2016/093260
PCT Pub. Date: Jun. 16, 2016

(65) Prior Publication Data
US 2017/0354027 A1 Dec. 7, 2017

(30) Foreign Application Priority Data

Dec. 12, 2014 (JP) .................................. 2014-252364

(51) Int. Cl.
*G06F 17/00* (2006.01)
*H05K 1/02* (2006.01)
(Continued)

(52) U.S. Cl.
CPC .............. *H05K 1/0203* (2013.01); *C09J 9/00* (2013.01); *C09J 163/00* (2013.01); *C09K 5/14* (2013.01);
(Continued)

(58) Field of Classification Search
CPC . G06F 1/181–1/182; H05K 7/20218–7/20381;
(Continued)

(56) References Cited

U.S. PATENT DOCUMENTS 4,201,472 A * 5/1980 Maeda ...................... G01J 1/44
324/132
5,442,142 A * 8/1995 Hayashi ............... H05K 1/0263
174/250

(Continued)

FOREIGN PATENT DOCUMENTS

JP 2000047947 A 1/2004
JP 2009277085 A 11/2009
(Continued)

OTHER PUBLICATIONS

Int'l Search Report dated Jan. 12, 2016.

*Primary Examiner* — Tuyen K Vo
(74) *Attorney, Agent, or Firm* — Honigman Miller Schwartz and Cohn LLP (57) ABSTRACT

A circuit assembly includes a circuit board, a heat dissipation member on which the circuit board is placed and that is configured to release heat of the circuit board, an insulating layer that is formed on a surface on the circuit board side of the heat dissipation member, a bonding portion made of a bonding agent that is arranged in a predetermined region between the circuit board and the heat dissipation member, and an adhesive portion that is arranged in a region other than the predetermined region between the circuit board and the heat dissipation member and that is made of an adhesive (Continued)

with which the circuit board and the heat dissipation member are bonded to each other with lower bonding force than with the bonding agent.

14 Claims, 9 Drawing Sheets

(51) Int. Cl.
| | |
|---|---|
| *G06F 21/86* | (2013.01) |
| *C09J 9/00* | (2006.01) |
| *C09J 163/00* | (2006.01) |
| *C09K 5/14* | (2006.01) |
| *G06F 21/60* | (2013.01) |
| *G06F 21/72* | (2013.01) |
| *H05K 1/18* | (2006.01) |

(52) U.S. Cl.
CPC ............ *G06F 21/602* (2013.01); *G06F 21/72* (2013.01); *G06F 21/86* (2013.01); *H05K 1/181* (2013.01); *H05K 2201/066* (2013.01); *H05K 2201/10272* (2013.01)

(58) Field of Classification Search
CPC ............ H05K 7/20409–7/20418; H05K 7/20009–7/202; H01L 23/367–23/3677; H01L 23/473; H01L 23/46–23/467
USPC ...... 361/676–678, 679.46–679.54, 688–723; 165/80.1–80.5, 104.33, 185; 174/15.1–15.3, 16.1–16.3, 547, 548; 257/712–722, E23.088; 24/453, 458–459; 454/184; 312/236; 235/375, 380, 451, 235/492
See application file for complete search history.

(56) References Cited

U.S. PATENT DOCUMENTS

| | | | | |
|---|---|---|---|---|
| 5,464,977 | A * | 11/1995 | Nakagiri ............ | G03F 7/70666 250/234 |
| 5,832,602 | A * | 11/1998 | Uezono ............... | B60R 16/0238 29/850 |
| 6,198,164 | B1 * | 3/2001 | Choi .................... | H01L 23/467 257/723 |
| 6,283,769 | B1 * | 9/2001 | Asao .................... | H01R 9/2466 439/74 |
| 6,621,701 | B2 * | 9/2003 | Tamba ............... | H05K 7/20927 165/80.4 |
| 7,292,441 | B2 * | 11/2007 | Smalc ................. | G06F 1/203 361/704 |
| 7,889,502 | B1 * | 2/2011 | Reis .................... | H05K 1/0203 165/80.3 |
| 8,488,316 | B2 * | 7/2013 | Zeng .................... | H02M 7/003 257/666 |
| 8,549,739 | B2 * | 10/2013 | Chiang .............. | H05K 7/20509 174/252 |
| 8,755,188 | B2 * | 6/2014 | Stella ................ | H01L 23/49562 361/709 |
| 8,824,145 | B2 * | 9/2014 | Hosseini ................ | F28D 15/02 361/699 |
| 2005/0179555 | A1 * | 8/2005 | Higashiyama .......... | G06F 21/86 340/686.1 |
| 2006/0043551 | A1 * | 3/2006 | Yamauchi ........... | H01L 23/3677 257/678 |
| 2006/0091509 | A1 * | 5/2006 | Zhao ....................... | H01L 23/04 257/678 |
| 2006/0218633 | A1 * | 9/2006 | Suzuki .................... | G06F 21/78 726/20 |
| 2007/0102142 | A1 * | 5/2007 | Reis .................... | H01L 23/3677 165/80.3 |
| 2008/0091605 | A1 * | 4/2008 | Hughes ................... | G06F 21/31 705/51 |
| 2008/0123335 | A1 * | 5/2008 | Yoo ...................... | G02F 1/13452 362/257 |
| 2009/0044901 | A1 * | 2/2009 | Chen ...................... | B32B 37/12 156/247 |
| 2009/0106563 | A1 * | 4/2009 | Cherpantier ............ | G06F 21/86 713/194 |
| 2010/0071077 | A1 * | 3/2010 | Morris ..................... | G06F 21/55 726/36 |
| 2010/0091464 | A1 * | 4/2010 | Ohnishi ................. | H01L 23/053 361/723 |
| 2011/0188207 | A1 * | 8/2011 | Won .......................... | G06F 1/20 361/709 |
| 2011/0246738 | A1 * | 10/2011 | Nakamura .............. | G06F 21/78 711/163 |
| 2012/0012881 | A1 * | 1/2012 | Lee .......................... | H01L 33/48 257/98 |
| 2012/0043127 | A1 * | 2/2012 | Lin ....................... | H05K 1/0203 174/266 |
| 2012/0063096 | A1 * | 3/2012 | Kearney ............. | H01L 23/3107 361/718 |
| 2013/0019114 | A1 | 1/2013 | Sumida | |
| 2013/0244020 | A1 * | 9/2013 | Terada ................... | C09J 133/08 428/317.3 |
| 2014/0111095 | A1 * | 4/2014 | Hashimoto ........ | H05B 33/0845 315/150 |
| 2014/0124914 | A1 * | 5/2014 | Lin ................... | H01L 21/28587 257/712 |
| 2015/0228591 | A1 * | 8/2015 | Kim ........................ | H01L 24/17 257/692 |
| 2015/0365227 | A1 * | 12/2015 | Billau ...................... | H04L 9/002 713/194 |
| 2016/0328180 | A1 * | 11/2016 | Wang ...................... | G06F 13/14 |

FOREIGN PATENT DOCUMENTS

| | | |
|---|---|---|
| JP | 2010086366 A | 4/2010 |
| JP | 2011210055 A | 10/2011 |

* cited by examiner

INFORMATION PROCESSING APPARATUS

CROSS-REFERENCE TO RELATED APPLICATIONS

This application is the U.S. national stage of PCT/JP2015/084468 filed Dec. 9, 2015, which claims priority of Japanese Patent Application No. JP 2014-252364 filed Dec. 12, 2014.

TECHNICAL FIELD

The present invention relates to an information processing apparatus having a function of preventing acquisition, manipulation and the like of information through unauthorized access.

BACKGROUND

In recent years, information processing apparatuses have been handling more sensitive information such as personal information and encryption keys that are used in encryption and decryption of information. Accordingly, information processing apparatuses need a function for preventing acquisition, manipulation and the like of sensitive information through unauthorized access, that is, a so-called anti-tampering function.

The anti-tampering function is realized in the case where, for example, the information processing apparatus is provided with a casing, a storage medium disposed in the casing and in which sensitive information is stored, and an erasing unit that erases information stored in this storage medium, by the erasing unit erasing information when opening of the casing is detected.

Incidentally, because sensitive information is always exposed to the danger of unauthorized access, the anti-tampering function needs to operate even in the case where power is not supplied from the power source when the information processing apparatus is not in use, and constant supply of power is needed to components constituting the anti-tampering function.

Accordingly, information processing apparatuses generally ensure constant supply of power for the anti-tampering function, by incorporating a battery, capacitor or the like for the anti-tampering function in addition to the power source for when the information processing apparatus is in use, and periodically replacing the battery, capacitor or the like.

An information processing apparatus (mobile terminal) described in JP 2011-210055A is provided with an information processing unit, a tamper detection circuit, a first battery that supplies power to the information processing unit and the tamper detection circuit, and a DIP switch that turns power supply from the first battery to the information processing unit ON and OFF. Furthermore, the information processing apparatus is provided with a second battery that supplies power to the tamper detection circuit as backup for the first battery.

The information processing apparatus reduces the power consumption of the first battery, by turning the DIP switch OFF in the case where the information processing unit does not need to be operated. The life of the first battery is thereby extended and the period from the start of storage in the case where the information processing apparatus is not in use until use of the second battery is started is extended. Accordingly, the anti-tampering function in the period during which the same second battery is incorporated is maintained for longer.

However, the cost and the time and effort involved in the periodical replacement of batteries or capacitors for the anti-tampering function mount up. Also, while the information processing apparatus described in JP 2011-210055A is able to extend the replacement period of batteries, capacitors or the like, there is a problem in that the configuration for controlling power supply is complex and the number of components increases.

The present invention was made in view of this situation, and has an object to provide an information processing apparatus that enables acquisition, manipulation and the like of information through unauthorized access to be prevented with a simple structure, without needing constant supply of power.

SUMMARY

An information processing apparatus according to the present invention is provided with a casing, a storage medium housed in the casing, a detection unit configured to detect opening of the casing, an erasing unit configured to erase information stored in the storage medium in a case where the detection unit detects opening of the casing, and a power source configured to supply power to the detection unit and the erasing unit, the power source being incorporated in the casing and having a photoelectric conversion unit that converts light into electric power.

According to the present invention, in the case where the casing is opened, the power source supplies power that the photoelectric conversion unit has converted from light that enters the casing to the erasing unit and the detection unit. Also, in the case where the detection unit detects opening of the casing, the erasing unit erases information stored in the storage medium.

Accordingly, the information processing apparatus is able to prevent acquisition, manipulation and the like of information through unauthorized access with a simple structure. Also, because the power source uses power generated through photoelectric conversion by the photoelectric conversion unit, it is no longer necessary to perform constant supply of power to the erasing unit.

The information processing apparatus according to the present invention is characterized in the detection unit being configured to detect opening of the casing, in a case where the photoelectric conversion unit outputs electric power.

According to the present invention, photoelectric conversion by the photoelectric conversion unit is used not only in power supply but also in detecting opening of the casing, thus enabling acquisition, manipulation and the like of information through unauthorized access to be prevented with a very simple structure.

The information processing apparatus according to the present invention is characterized in being provided with a communication unit configured to communicate with an external device, and a reception unit configured to accept, from the external device via the communication unit, an instruction to stop erasure of the information, and the erasing unit being configured to stop erasure of the information, in a case where the reception unit accepts the instruction.

According to the present invention, erasure of information can be stopped by an external device, thus enabling erasure of information being performed when the casing is opened to be prevented, in the case of performing adjustment, repair or the like of the information processing apparatus.

The information processing apparatus according to the present invention is characterized in being provided with an authentication unit configured to authenticate the external device, and the reception unit being configured to accept the instruction by the external device, in a case where the authentication unit has authenticated the external device.

According to the present invention, authentication of the external device is performed, and thus erasure being stopped by an unauthorized external device and acquisition, manipulation and the like of information being carried out can be prevented.

The information processing apparatus according to the present invention is characterized in the casing having an opening part configured to be opened and closed, the photoelectric conversion unit having a light receiving surface, and the light receiving surface being located on the opening part side of the casing.

According to the present invention, the light receiving surface is located on the opening part side, thus enabling opening of the casing to be reliably detected in the case where the opening part is opened.

The information processing apparatus according to the present invention is characterized in the power source having a plurality of the photoelectric conversion units.

According to the present invention, opening can be reliably detected, even in the case where the casing is opened from various locations.

According to the present invention, acquisition, manipulation and the like of information through unauthorized access can be prevented with a simple structure, without needing constant supply of power.

DETAILED DESCRIPTION OF PREFERRED EMBODIMENTS

Hereinafter, an information processing apparatus according to the present invention will be described in detail based on the drawings showing embodiments thereof.

First Embodiment

Figure 1:
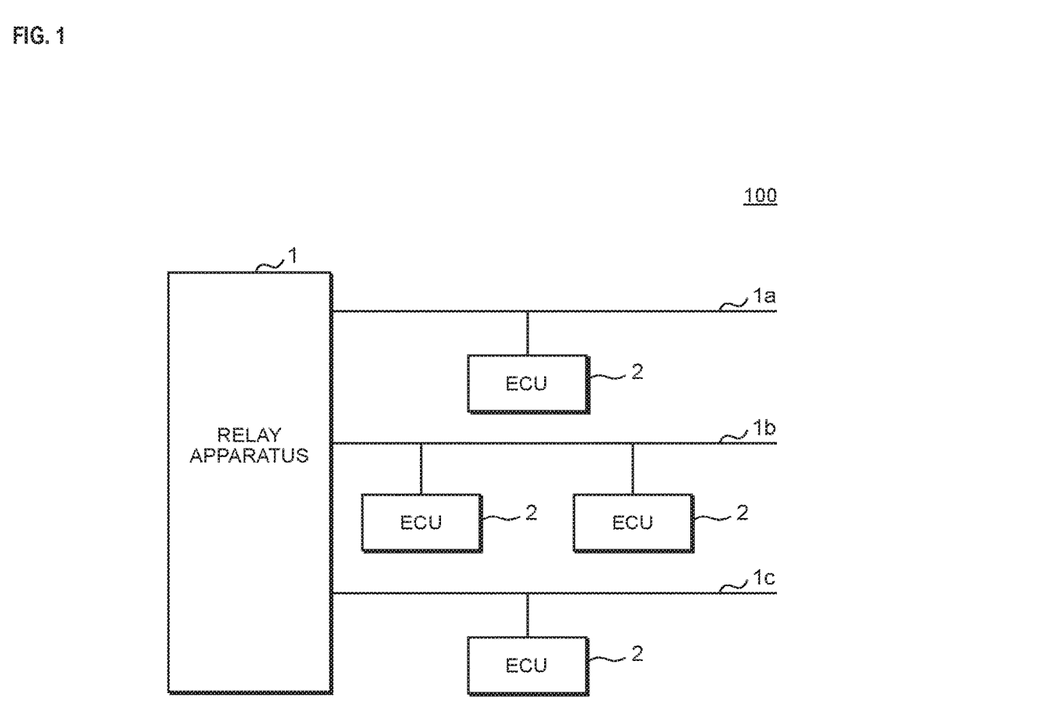
FIG. 1 is a block diagram showing the configuration of a communication system according to a first embodiment.

FIG. 1 is a block diagram showing the configuration of a communication system according to a first embodiment. In FIG. 1, 100 denotes a communication system, and the communication system 100 is installed in a vehicle and provided with a relay apparatus 1, buses 1a, 1b, 1c, . . . connected to the relay apparatus 1, and ECUs (electronic control units) 2, 2, 2, . . . connected to the buses 1a, 1b, 1c, . . . .

The relay apparatus 1 performs processing for receiving information, by receiving and decrypting information encrypted by the ECUs 2. Also, the relay apparatus 1 performs processing for transmitting information to the ECUs 2, by encrypting and transmitting information. The communication system 100 functions as a result of the relay apparatus 1 relaying, by reception processing and transmission processing, communication between ECUs 2, 2, . . . connected to different ones of the buses 1a, 1b, 1c, . . . .

For example, the communication system 100 is provided with a reception ECU 2 that accepts ON/OFF of a door lock, and an operation ECU 2 that perform an ON/OFF operation of the door lock. The reception ECU 2 is connected to the bus 1a, and the operation ECU 2 is connected to the bus 1b.

The reception ECU 2, in the case of accepting a signal related to ON/OFF of the door lock from outside, transmits this signal to the relay apparatus 1. The relay apparatus 1b, after performing signal reception processing, performs processing for transmitting the signal to the operation ECU 2. The operation ECU 2 turns the door lock ON/OFF in accordance with the received signal.

Communication related to ON/OFF of the door lock between the reception ECU 2 and the operation ECU 2 via the relay apparatus 1 is performed as a result of the above. Note that communication in the communication system 100 is performed using the CAN protocol, for example.

Figure 2:
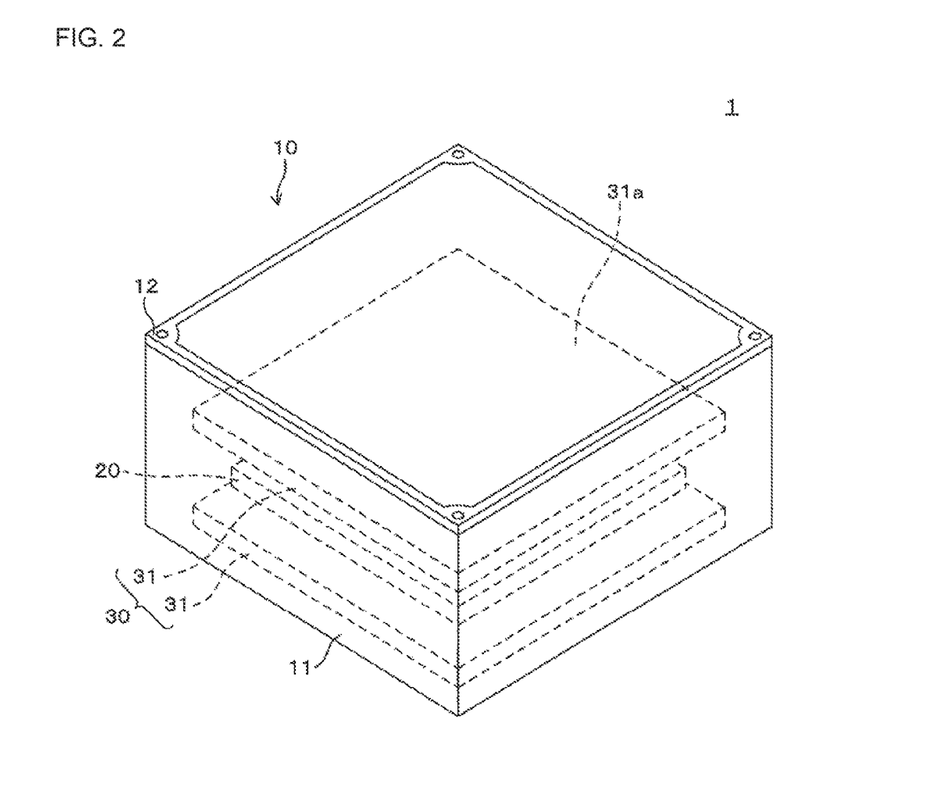
FIG. 2 is a schematic view showing the configuration of a relay apparatus.
Figure 3:
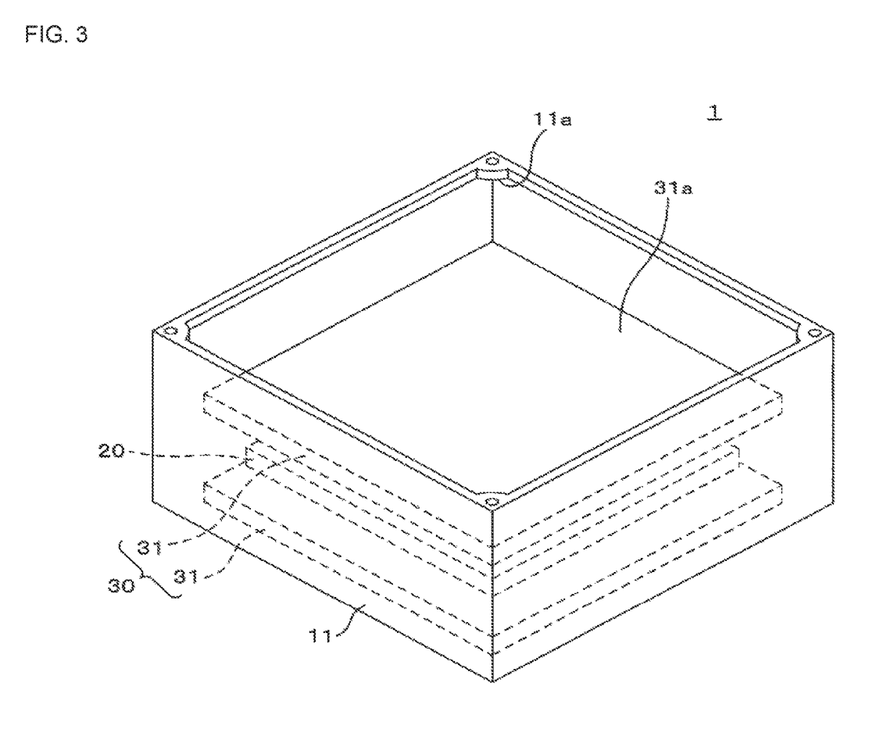
FIG. 3 is a schematic view showing the configuration of the relay apparatus.
Figure 4:
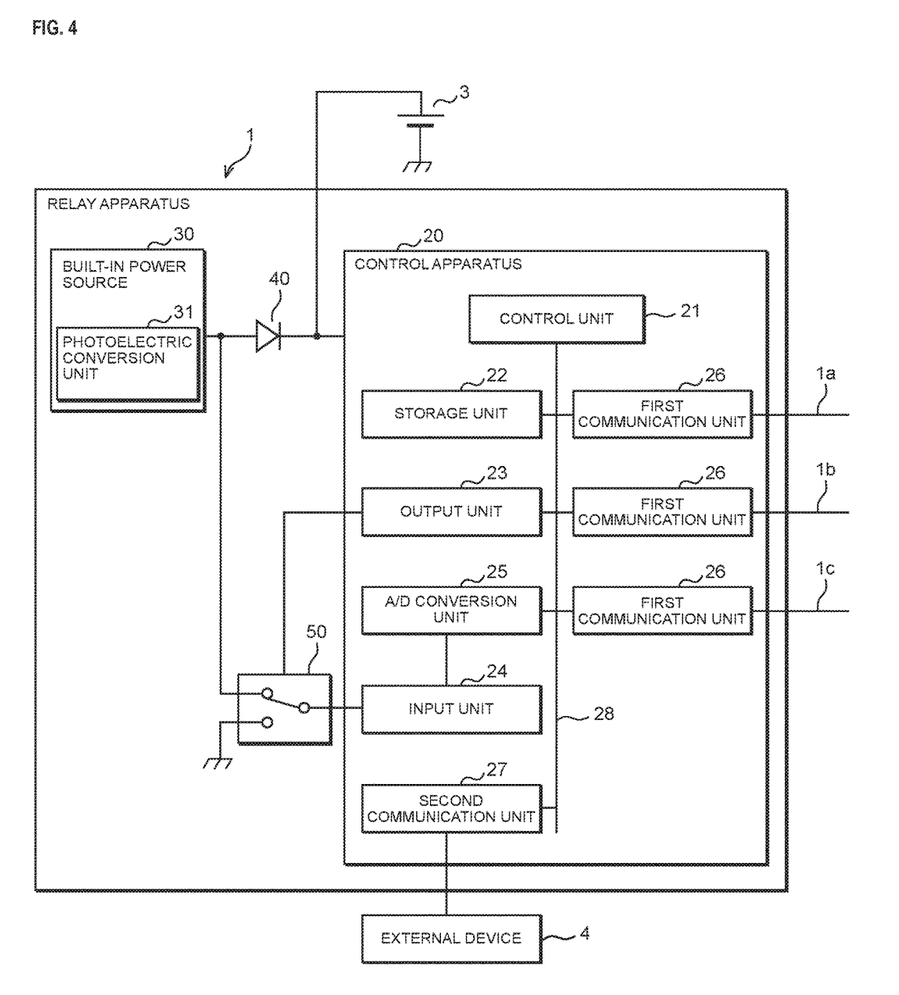
FIG. 4 is a block diagram showing the configuration of the relay apparatus.

FIGS. 2 and 3 are schematic views showing the configuration of the relay apparatus 1. Also, FIG. 4 is a block diagram showing the configuration of the relay apparatus 1. The relay apparatus 1 has a casing 10 having a light blocking effect, a control apparatus 20 that is disposed on the inside of the casing 10 and performs relay by the relay apparatus 1, and a built-in power source 30 that supplies power to the control apparatus 20.

As shown in FIG. 2, the casing 10 has a hollow rectangular parallelepiped main body 11, and a plate-like lid part 12 that is removably attached to one surface of the main body. Also, as shown in FIG. 3, an opening part 11a is provided in the one surface of the main body 11. FIG. 3 shows a state where the opening part 11a has been opened. The opening part 11a is opened and closed by the lid part 12. The relay apparatus 1 is configured such that light does not enter the casing 10, by closing the opening part 11a with the lid part 12.

The built-in power source 30 has two plate-like photoelectric conversion units 31 and 31 that oppose each other with the plate-like control apparatus 20 interposed therebetween. One photoelectric conversion unit 31 is disposed such that a light receiving surface 31a is located on the opening part 11a side, and the surface on the opposite side to the light receiving surface 31a opposes one surface of the control apparatus 20. The other photoelectric conversion unit 31 is disposed such the light receiving surface 31a opposes a wall of the main body 11 on the opposite side to the opening part 11a, and the surface on the opposite side to the light receiving surface 31a opposes the other surface of the control apparatus 20.

As a result of the light receiving surface 31a being located on the opening part 11a side, light is irradiated onto the light receiving surface 31a of the one photoelectric conversion unit 31, in the case where the opening part 11a is opened and light enters the main body 11. Also, in the case where the main body 11 is opened from the surface on the opposite side to the opening part 11a and light enters, light is irradiated onto the light receiving surface 31a of the other photoelectric conversion unit 31. In the case where light is irradiated onto the light receiving surface 31a, the photoelectric conversion unit 31 converts the light irradiated onto the light receiving surface 31a into electric power. A solar cell, for example, is used for the photoelectric conversion unit 31.

As shown in FIG. 4, the photoelectric conversion unit 31 is connected to the control apparatus 20 via a diode 40. The photoelectric conversion unit 31 is connected to an anode of the diode 40. Note that although, in FIG. 4, only one photoelectric conversion unit 31 is shown and description of the other photoelectric conversion unit 31 is omitted, the other photoelectric conversion unit 31 is similarly connected to the control apparatus 20, and the two photoelectric conversion units 31 and 31 each achieve functions which will be discussed later.

Also, an external power source 3 such as a battery, for example, is connected to the control apparatus 20. The control apparatus 20 has a control unit 21 such as a CPU or a MPU, and a storage unit 22 having a ROM, a RAM, a nonvolatile memory or the like. The storage unit 22 stores programs that are executed by the control unit 21, personal information of a user of the communication system 100 or encryption key information for communication which will be discussed later. Also, the storage unit 22 stores various data that is produced when the control unit 21 executes computational processing.

Also, the control apparatus 20 is provided with an output unit 23, an input unit 24 and an A/D conversion unit 25 connected to the input unit 24.

Furthermore, the control apparatus 20 is provided with first communication units 26, 26, 26, . . . that communicate with the ECUs 2, 2, 2, . . . , a second communication unit 27 that communicates with an external device 4, and a bus 28.

The control unit 21, the storage unit 22, the output unit 23, the A/D conversion unit 25, the first communication units 26, 26, 26, . . . and the second communication unit 27 are each connected to the bus 28. Also, the first communication units 26, 26, 26, . . . are respectively connected to the buses 1a, 1b, 1c, . . . , and the second communication unit 27 is connected to the external device 4.

The input unit 24 is connected to a connection node between the photoelectric conversion unit 31 and the diode 40 via a switch 50. The switch 50 is a change-over contact switch that is turned ON/OFF under the control of the control unit 21. A common terminal of the switch 50 is connected to the input unit 24.

Also, the normally open terminal of the switch 50 is connected to the connection point of the built-in power source 30 and the diode 40, and the normally closed terminal is grounded. FIG. 4 shows a state where the switch 50 is ON, and the common terminal and the normally open terminal are connected.

Hereinafter, the operations of the relay apparatus 1 will be described. The control apparatus 20 operates on receipt of power supply from the external power source 3 during use of the communication system 100. The relay function of the relay apparatus 1 is carried out by the control apparatus 20.

In the case where encrypted information is received from the ECUs 2, 2, 2, . . . via the first communication units 26, 26, 26, . . . , the control apparatus 20 acquires the information as a result of the control unit 21 reading out encryption key information from the storage unit 22 and decrypting the encrypted information.

Also, after the control unit 21 has read out encryption key information from the storage unit 22 and encrypted information, the control apparatus 20 transmits the encrypted information to the ECUs 2, 2, 2, . . . via the first communication units 26, 26, 26, . . . .

Also, in the case where power is not supplied from the external power source 3, the control apparatus 20 operates using power supply from the built-in power source 30. In the case where the photoelectric conversion unit 31 performs photoelectric conversion and the built-in power source 30 supplies power to the control apparatus 20, the voltage output by the photoelectric conversion unit 31 is input to the input unit 24 via the switch 50, when the switch 50 is ON.

The input analog voltage value is converted into a digital voltage value by the A/D conversion unit 25 and input to the control unit 21. On the other hand, when the switch 50 is OFF, a voltage value of zero volts is input to the input unit 24.

Also, current from the external power source 3 is prevented from flowing to the input unit 24 by the diode 40. Accordingly, the control unit 21 is able to detect photoelectric conversion by the photoelectric conversion unit 31 using the voltage value that is input via the input unit 24, the A/D conversion unit 25 and the switch 50.

Here, in the case where the casing 10 is opened and light enters the casing 10, the photoelectric conversion unit 31 outputs a voltage related to photoelectric conversion, thus enabling the relay apparatus 1 to detect opening of the casing 10.

Also, the control unit 21 periodically performs the following processing. Here, the switch 50 is ON as long as an operation which will be described later is not performed on the relay apparatus 1 by the external device 4.

Figure 5:
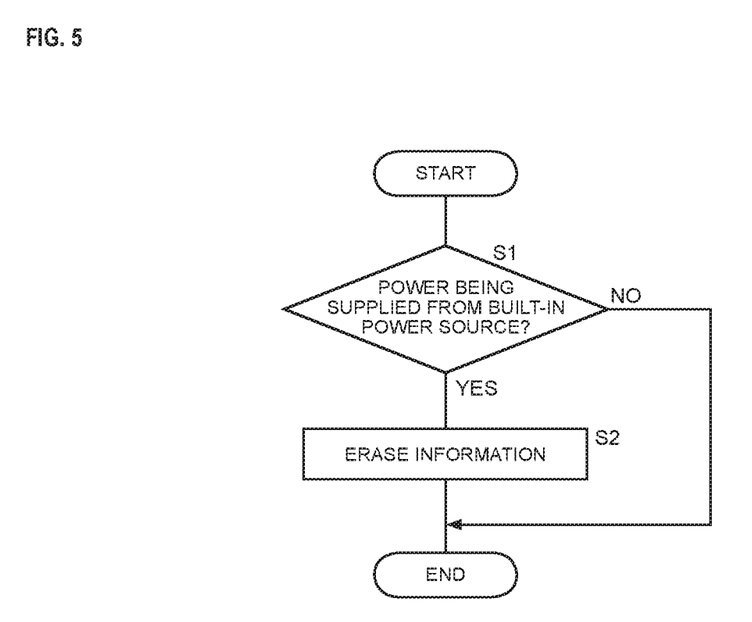
FIG. 5 is a flowchart showing a processing procedure of a control unit related to erasure of information.

FIG. 5 is a flowchart showing a processing procedure of the control unit 21 related to erasure of information. The control unit 21 determines whether power is being supplied to the control apparatus 20 from the built-in power source 30 (S1).

The control unit 21, in the case of having determined that power is being supplied from the built-in power source 30 (S1: YES), erases information that is stored in the storage unit 22 (S2). On the other hand, the control unit 21, in the case of having determined that power is not being supplied from the built-in power source 30 (S1: NO), ends the processing related to erasure of information.

By performing the above processing periodically, acquisition, manipulation and the like of information stored in the storage unit 22 through unauthorized access can be prevented. However, in the case where a problem with the relay apparatus 1 such as an operation malfunction or failure occurs, maintenance work such as adjustment or repair will be needed.

In the case of carrying out maintenance work, it is inappropriate for the anti-tampering function for preventing acquisition, manipulation and the like of information stored in the storage unit 22 through unauthorized access to operate. Accordingly, the storage unit 22 stores an anti-tampering mode for operating the anti-tampering function, and in the case where the anti-tampering mode is OFF, the control unit 21 detects a voltage value of zero volts, and does not erase information that is stored in the storage unit 22.

Here, the switch 50 is ON in the case where the anti-tampering mode is ON, and the switch 50 is OFF in the case where the anti-tampering mode is OFF. As will be discussed later, the relay apparatus 1, as a result of the anti-tampering mode being switched ON/OFF by operating the external device 4, prevents information stored in the storage unit 22 from being accidentally erased at the time of adjustment, repair or the like.

Figure 6:
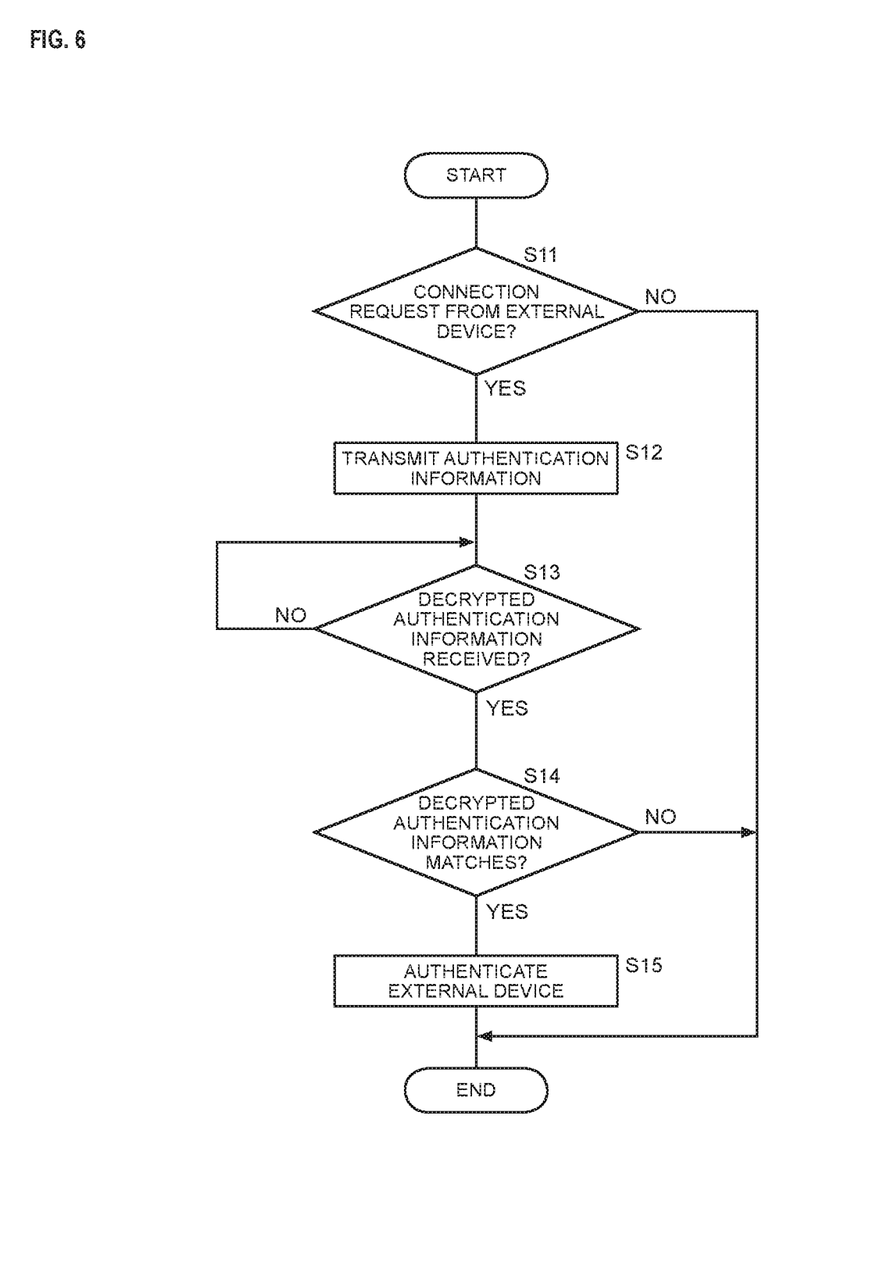
FIG. 6 is a flowchart showing a processing procedure of the control unit related to authentication of an external device.

The control unit 21 periodically performs processing for authenticating the external device 4 using a so-called challenge and response method, in the case where the external device 4 is connected to the second communication unit 27. Here, a legitimate external device 4 that is authenticated by the control unit 21 stores the same encryption key information as the storage unit 22. FIG. 6 is a flowchart showing a processing procedure of the control unit 21 related to authentication of the external device 4.

The control unit 21 determines whether a connection request has been received from the external device 4 to the second communication unit 27 (S11). The control unit 21, in the case of having determined that a connection request has been received from the external device 4 (S11: YES), reads out authentication information for authenticating whether the external device 4 is legitimate from the storage unit 22, and causes the second communication unit 27 to transmit this authentication information to the external device 4 (S12). On the other hand, the control unit 21, in the case of having determined that a connection request has not been received from the external device 4 (S11: NO), ends the processing for authenticating the external device 4.

The control unit 21, after transmitting the authentication information to the external device 4, determines whether the second communication unit 27 has received authentication information decrypted by the external device 4 (S13). The control unit 21, in the case of having determined that the second communication unit 27 has received decrypted authentication information (S13: YES), determines whether the authentication information decrypted by the external device 4 matches authentication information decrypted in the relay apparatus 1 using encryption key information stored in the storage unit 22 (S14). On the other hand, the control unit 21, in the case of having determined that authentication information decrypted by the external device 4 has not been received (S13: NO), returns to step S13.

The control unit 21, in the case of having determined that the authentication information decrypted by the external device 4 matches authentication information decrypted in the relay apparatus 1 (S14: YES), authenticates the external device 4 (S15). The control unit 21, in the case of having determined that the authentication information decrypted by the external device 4 does not match authentication information decrypted in the relay apparatus 1 (S14: NO), ends the processing for authenticating the external device 4.

Figure 7:
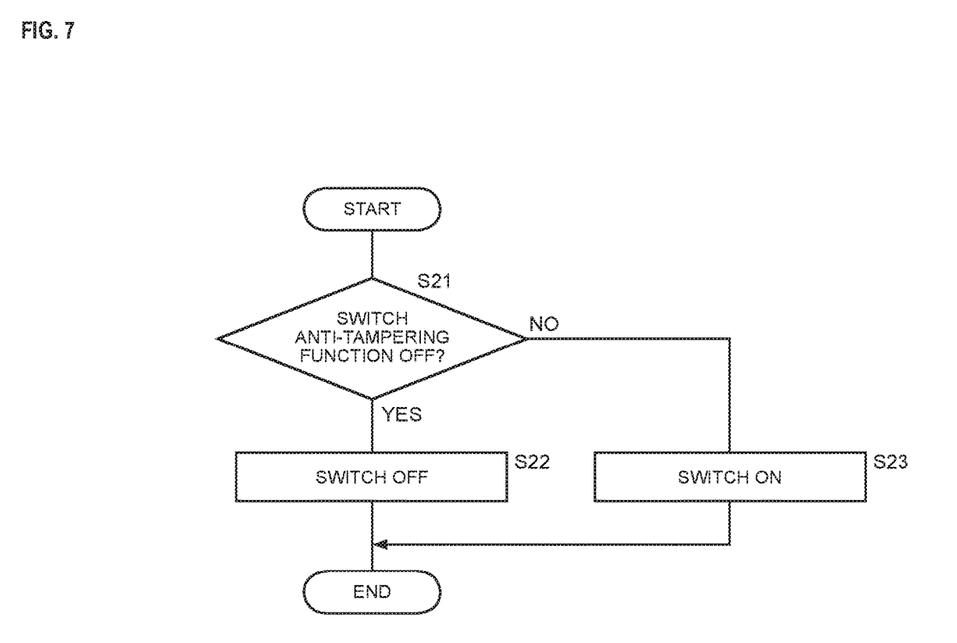
FIG. 7 is a flowchart showing a processing procedure of the control unit related to setting of an anti-tampering mode after authentication of an external device.

In the case where the control unit 21 performs the above processing and authenticates the external device 4, setting of the anti-tampering mode in the relay apparatus 1 through operation of the external device 4 becomes possible. FIG. 7 is a flowchart showing a processing procedure of the control unit 21 related to setting of the anti-tampering mode after authentication of the external device 4.

The control unit 21 determines whether an instruction to turn OFF the anti-tampering mode has been received from the external device 4 (S21). The control unit 21, in the case of having determined that an instruction to turn OFF the anti-tampering mode has been received from the external device 4 (S21: YES), turns OFF the switch 50 (S22).

The control unit 21, in the case of having determined that an instruction to turn OFF the anti-tampering mode has not been received from the external device 4 (S21: NO), maintains or switches the switch 50 to an ON state (S23). As a result of the switch 50 switching to OFF, the voltage value that is input to the input unit 24 changes to zero volts, and the anti-tampering function does not operate.

Accordingly, the control unit 21 does not erase information stored in the storage unit 22, even in the case where the opening part 11a of the casing 10 is opened, enabling an operator to safely carry out maintenance work on the relay apparatus 1. By turning ON the anti-tampering mode through operation of the external device 4 after the maintenance work, the anti-tampering function can be operated again.

With the above configuration, in the case where the casing 10 is opened, the built-in power source 30 supplies power converted by the photoelectric conversion unit 31 from light that enters the casing 10 to the control unit 21. Also, the control unit 21 erases information stored in the storage unit 22, in the case where opening of the casing 10 is detected.

Accordingly, the relay apparatus 1 is able to prevent acquisition, manipulation and the like of information through unauthorized access with a simple structure. Also, because the built-in power source 30 uses power generated through photoelectric conversion by the photoelectric conversion unit 31, it is no longer necessary to perform constant supply of power to the control unit 21.

Also, because the light receiving surface 31a of one photoelectric conversion unit 31 is located on the opening part 11a side, the relay apparatus 1 is able to reliably detect opening of the casing 10, in the case where the opening part 11a is opened. Furthermore, in the case where the casing 10 is opened from various places corresponding to the orientation of the respective light receiving surfaces 31a of the two photoelectric conversion units 31 and 31, the information relay apparatus 1 is able to reliably detect opening thereof. The tamper-proofness of the relay apparatus 1 is thereby further enhanced.

Furthermore, because photoelectric conversion by the photoelectric conversion unit 31 is used not only in power supply but also in detecting opening of the casing, the relay apparatus 1 is able to prevent acquisition, manipulation and the like of information through unauthorized access with a very simple structure. Also, because the control unit 21 performs authentication of the external device 4, acquisition, manipulation and the like of information being carried out due to erasure of information being stopped, in the case where the external device 4 is not legitimate, can be prevented.

Note that, the present invention is not limited to the relay apparatus 1, and may be an ECU or a general information processing apparatus. Also, the number of photoelectric conversion units is not limited to two, and there may be only one or more than two.

Furthermore, the light receiving surface 31a need only be located on the opening side, and the photoelectric conversion unit 31 need not oppose the control apparatus 20. For example, a configuration may be adopted in which the surface of the photoelectric conversion unit 31 on the opposite side to the light receiving surface 31a opposes a side surface of the control apparatus 20. Also, as long as a configuration is adopted in which light that enters through the opening part 11a is irradiated onto the light receiving surface 31a, other configurations such as a configuration in which the light receiving surface 31a opposes the control apparatus 20 may be adopted.

Furthermore, the method of authenticating the external device 4 is not limited to a challenge and response method, and other methods may be adopted as long as authentication is possible. Also, although, in the first embodiment, the control unit 21 performs erasure and detection, a configuration may be adopted in which an erasing unit for performing erasure, a detection unit for performing detection or the like is separately provided.

Second Embodiment

Figure 8:
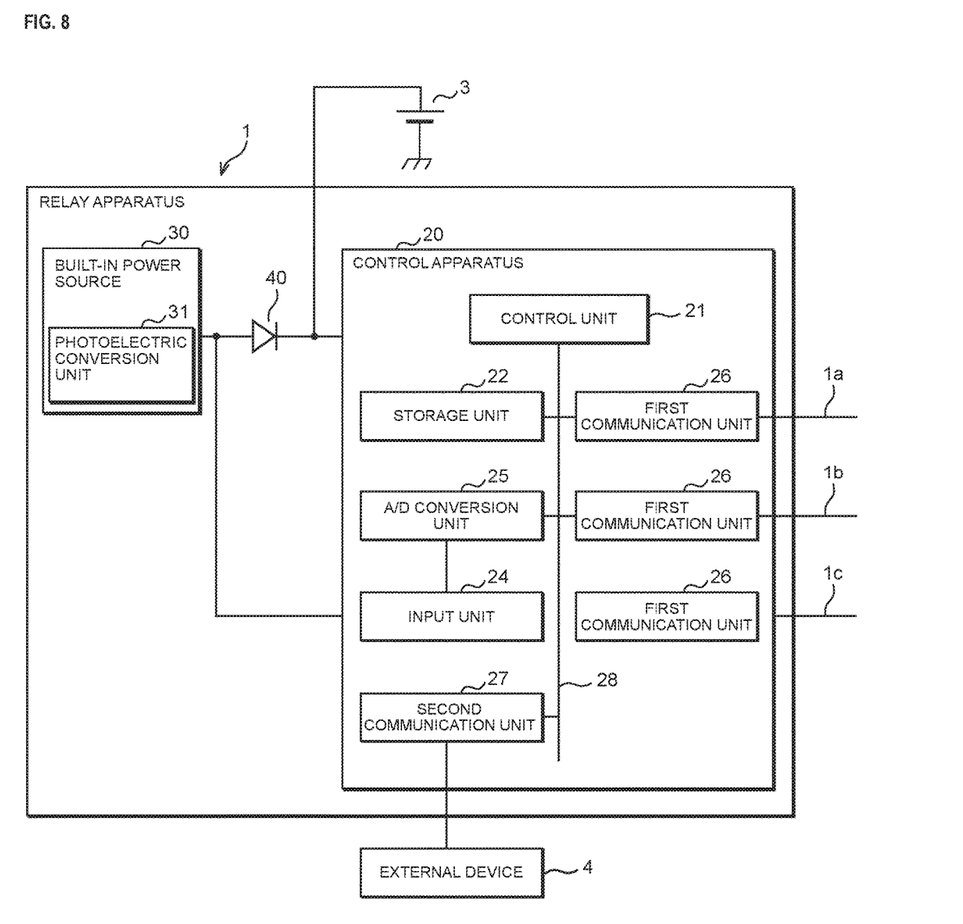
FIG. 8 is a block diagram showing the configuration of a relay apparatus according to a second embodiment.

FIG. 8 is a block diagram showing the configuration of the relay apparatus 1 according to a second embodiment. With regard to the configuration of the relay apparatus 1 according to the second embodiment, the same reference numerals are given to configuration that is similar to the first embodiment, and detailed description thereof will be omitted.

In the second embodiment, the input unit 24 is connected directly to a connection node of the built-in power source 30 and the diode 40, rather than via a switch. Also, because the connection is not via a switch, an output unit or the like for the control unit 21 to output commands to a switch is not provided. Even in the case where the connection is not via a switch, the control unit 21 is able to detect power generation by the photoelectric conversion unit 31 using signals that are input via the input unit 24 and the A/D conversion unit 25, similarly to the first embodiment. Accordingly, because light enters the casing 10 and the photoelectric conversion unit 31 generates power in the case where the casing 10 is opened for the purpose of unauthorized access, the relay apparatus 1 is able to detect opening of the casing 10.

Also, the relay apparatus 1 performs authentication of the external device 4, similarly to the first embodiment. Also, the storage unit 22 stores an anti-tampering mode, and the anti-tampering mode can be switched ON/OFF in the relay apparatus 1 by an authenticated external device 4.

Figure 9:
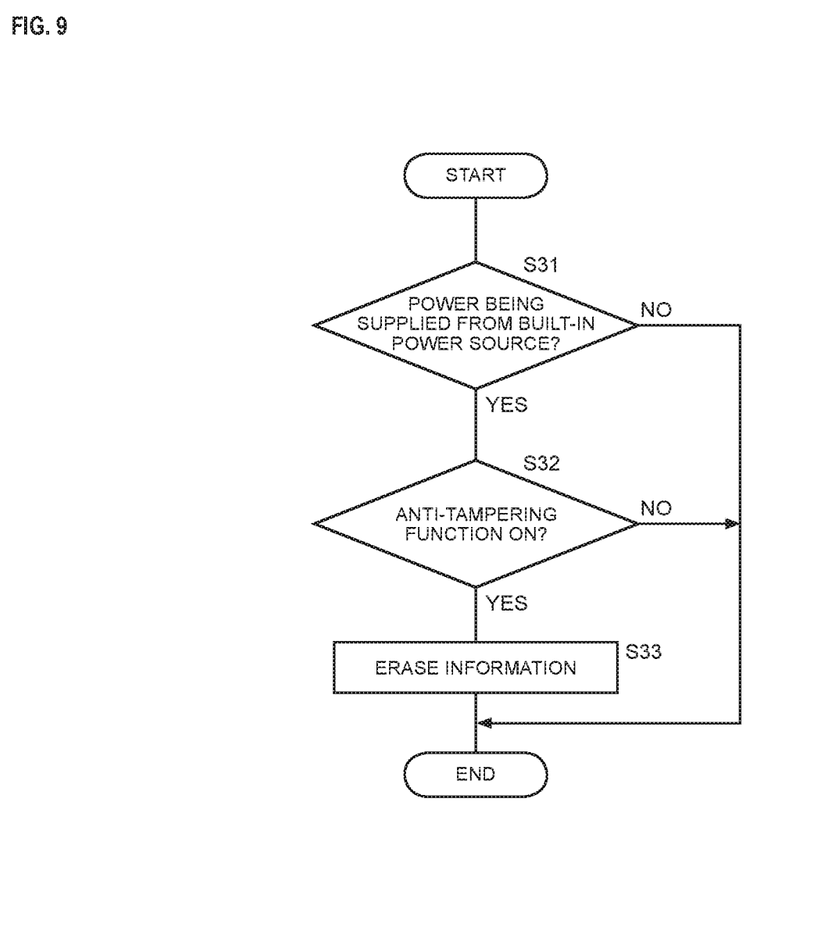
FIG. 9 is a flowchart showing a processing procedure of a control unit related to erasure of information.

FIG. 9 is a flowchart showing a processing procedure of the control unit 21 related to erasure of information. The control unit 21 determines whether power is being supplied from the built-in power source 30, based on the voltage value that is input to the input unit 24 (S31). The control unit 21, in the case of having determined that power is being supplied (S31: YES), determines whether the anti-tampering mode is ON (S32). On the other hand, the control unit 21, in the case of having determined that power is not being supplied from the built-in power source 30 (S31: NO), ends the processing related to erasure of information.

The control unit 21, in the case of having determined that the anti-tampering mode is ON (S32: YES), erases information stored in the storage unit 22 (S33). On the other hand, the control unit 21, in the case of having determined that the anti-tampering mode is OFF (S32: NO), ends the processing related to erasure of information.

According to the above configuration, in the case where the anti-tampering mode is OFF, the control unit 21 does not erase information stored in the storage unit 22, even when the opening part 11a of the casing 10 is opened, enabling an operator to safely carry out maintenance work on the relay apparatus 1. By turning the anti-tampering mode ON through operation of the external device 4 after the maintenance work, the anti-tampering function can be operated again.

Also, similarly to the first embodiment, in the case where the casing 10 is opened, the built-in power source 30 supplies power converted by the photoelectric conversion unit 31 from light that enters the casing 10 to the control unit 21. Also, the control unit 21 erases information stored in the storage unit 22, in the case where opening of the casing 10 is detected.

Accordingly, the relay apparatus 1 is able to prevent acquisition, manipulation and the like of information through unauthorized access with a simple structure. Also, because the built-in power source 30 uses power generated through photoelectric conversion by the photoelectric conversion unit 31, constant supply of power to the control unit 21 does not need to be performed.

Furthermore, because photoelectric conversion by the photoelectric conversion unit 31 is used not only in power supply but also in detecting opening of the casing, the relay apparatus 1 is able to prevent acquisition, manipulation and the like of information through unauthorized access with a very simple structure. Also, because the control unit 21 performs authentication of the external device 4, acquisition, manipulation and the like of information being carried out due to erasure of information being stopped, in the case where the external device 4 is not legitimate, can be prevented.

The embodiments disclosed herein are intended to be illustrative in all respects, and not restrictive. The scope of the present invention is indicated by the claims rather than the above description, and all modifications that come within the meaning and range of equivalency of the claims are intended to be embraced herein. That is, embodiments obtained through combining technical means modified as appropriate in the scope indicated in the claims are also embraced in the technical scope of the invention.

The invention claimed is:

1. An information processing apparatus comprising:
   a casing;
   a storage medium housed in the casing;
   a control unit having a detection unit and an erasing unit, the detection unit configured to detect opening of the casing;
   the erasing unit configured to erase information stored in the storage medium in a case; and
   a power source including an external power source and a photoelectric conversion unit that converts light into electric power, both configured to supply power to the detection unit and the erasing unit,
   wherein the photoelectric conversion unit is incorporated in the casing, wherein the control unit is configured to actuate the erasing unit to erase information stored in the storage medium only when power is supplied by the photoelectric conversion unit.

2. The information processing apparatus according to claim 1,
   wherein the detection unit is configured to detect opening of the casing, in a case where the photoelectric conversion unit outputs electric power.

3. The information processing apparatus according claim 2,
   wherein the casing has an opening part configured to be opened and closed,
   the photoelectric conversion unit has a light receiving surface, and
   the light receiving surface is located on the opening part side of the casing.

4. The information processing apparatus according to claim 3, wherein the power source has a plurality of the photoelectric conversion units.

5. The information processing apparatus according to claim 2, wherein the power source has a plurality of the photoelectric conversion units.

6. The information processing apparatus according to claim 2, comprising:
   a communication unit configured to communicate with an external device; and
   a reception unit configured to accept, from the external device via the communication unit, an instruction to stop erasure of the information, wherein the erasing unit is configured to stop erasure of the information, in a case where the reception unit accepts the instruction.

7. The information processing apparatus according to claim 2, comprising:
   an authentication unit configured to authenticate an external device, wherein a reception unit is configured to accept the instruction by the external device, in a case where the authentication unit has authenticated the external device.

8. The information processing apparatus according to claim 1, comprising:
   a communication unit configured to communicate with an external device; and
   a reception unit configured to accept, from the external device via the communication unit, an instruction to stop erasure of the information,
   wherein the erasing unit is configured to stop erasure of the information, in a case where the reception unit accepts the instruction.

9. The information processing apparatus according to claim 8, comprising:
   an authentication unit configured to authenticate the external device, wherein the reception unit is configured to accept the instruction by the external device, in a case where the authentication unit has authenticated the external device.

10. The information processing apparatus according claim 8, wherein the casing has an opening part configured to be opened and closed, the photoelectric conversion unit has a light receiving surface, and the light receiving surface is located on the opening part side of the casing.

11. The information processing apparatus according to claim 8, wherein the power source has a plurality of the photoelectric conversion units.

12. The information processing apparatus according to claim 1, comprising:
   an authentication unit configured to authenticate an external device,
   wherein a reception unit is configured to accept the instruction by the external device, in a case where the authentication unit has authenticated the external device.

13. The information processing apparatus according claim 12, wherein the casing has an opening part configured to be opened and closed, the photoelectric conversion unit has a light receiving surface, and the light receiving surface is located on the opening part side of the casing.

14. The information processing apparatus according to claim 12, wherein the power source has a plurality of the photoelectric conversion units.

* * * * *